(12) United States Patent
Tham et al.

(10) Patent No.: US 11,900,058 B2
(45) Date of Patent: *Feb. 13, 2024

(54) RING MOTION CAPTURE AND MESSAGE COMPOSITION SYSTEM

(71) Applicant: Snap Inc., Santa Monica, CA (US)

(72) Inventors: Yu Jiang Tham, San Diego, CA (US); Jonathan M. Rodriguez, II, Beverly Hills, CA (US); Nir Daube, Pacific Palisades, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,194

(22) Filed: Jan. 25, 2023

(65) Prior Publication Data

US 2023/0161959 A1    May 25, 2023

Related U.S. Application Data

(63) Continuation of application No. 17/004,344, filed on Aug. 27, 2020, now Pat. No. 11,580,300.

(60) Provisional application No. 62/907,679, filed on Sep. 29, 2019.

(51) Int. Cl.
| | |
|---|---|
| *G06F 3/04812* | (2022.01) |
| *G06F 40/274* | (2020.01) |
| *G06F 3/01* | (2006.01) |
| *H04L 51/06* | (2022.01) |
| *G06F 3/04886* | (2022.01) |

(52) U.S. Cl.
CPC ............ *G06F 40/274* (2020.01); *G06F 3/014* (2013.01); *G06F 3/04812* (2013.01); *G06F 3/04886* (2013.01); *H04L 51/06* (2013.01)

(58) Field of Classification Search
CPC .... G06F 40/274; G06F 3/014; G06F 3/04812; G06F 3/04886; G06F 3/0237; H04L 51/06
See application file for complete search history.

(56) References Cited

U.S. PATENT DOCUMENTS

| | | |
|---|---|---|
| 7,453,439 B1 | 11/2008 | Kushler et al. |
| 8,179,604 B1 | 5/2012 | Gomez et al. |
| 8,624,836 B1 | 1/2014 | Miller et al. |
| 9,582,076 B2 | 2/2017 | Kienzle et al. |
| 9,594,427 B2 | 3/2017 | Priyantha et al. |
| 10,043,125 B2 | 8/2018 | Park |
| 11,580,300 B1 | 2/2023 | Tham et al. |
| 2014/0285416 A1 | 9/2014 | Priyantha et al. |
| 2015/0287412 A1 | 10/2015 | Tang |

(Continued)

*Primary Examiner* — Phuong H Nguyen
(74) *Attorney, Agent, or Firm* — Culhane Meadows PLLC; Stephen J. Weed

(57) ABSTRACT

Systems, devices, media, and methods are presented for composing and sharing a message based on the motion of a handheld electronic device such as a ring. The methods in some implementations include presenting a keyboard on a display, collecting course data associated with a course traveled by the ring, and overlying a trace onto the keyboard, such that the trace is correlated in near real-time with the course traveled by the ring. In some implementations the display element is part of a portable device, such as the lens of an electronic eyewear device. Based on the course data relative to the key locations on the keyboard, the system identifies and presents candidate words to be included in a message.

20 Claims, 12 Drawing Sheets

(56) References Cited

U.S. PATENT DOCUMENTS

2016/0328147 A1* 11/2016 Zhang .................. G06F 3/04847
2017/0003762 A1* 1/2017 Ishii ....................... G04G 21/02
2017/0147138 A1 5/2017 Dow et al.

* cited by examiner

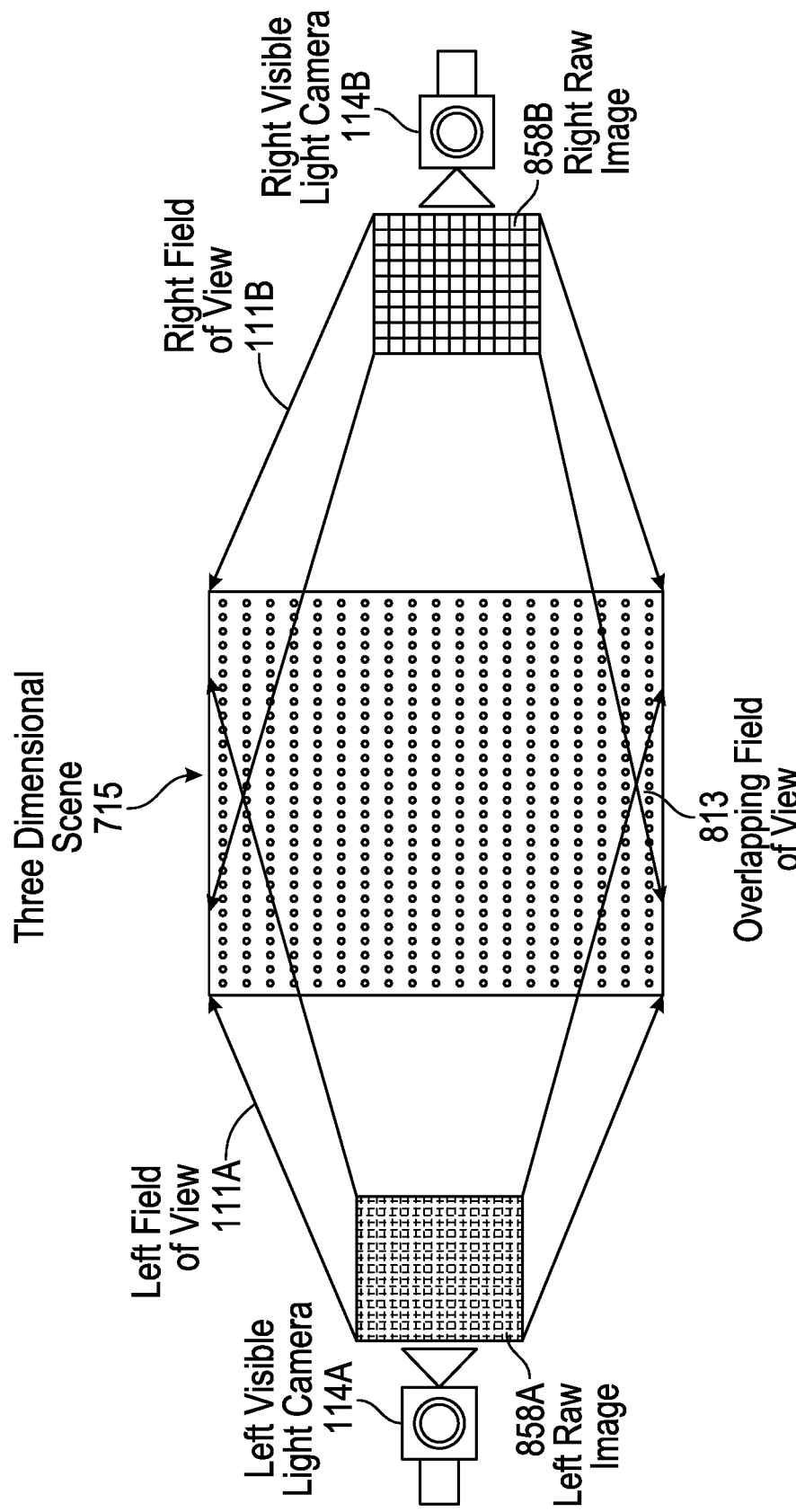

RING MOTION CAPTURE AND MESSAGE COMPOSITION SYSTEM

CROSS-REFERENCE TO RELATED APPLICATIONS

This application is a Continuation of U.S. application Ser. No. 17/004,344 filed on Aug. 27, 2020, and claims priority to U.S. Provisional Application Ser. No. 62/907,679 filed on Sep. 29, 2019, the contents of which are incorporated fully herein by reference.

TECHNICAL FIELD

Examples set forth in the present disclosure relate to portable electronic devices, including wearable devices such as eyewear. More particularly, but not by way of limitation, the present disclosure describes systems and methods for composing a message based on the motion of a handheld electronic device such as a ring.

BACKGROUND

Many types of computers and electronic devices available today, including mobile devices (e.g., smartphones, tablets, and laptops), handheld devices (e.g., smart rings), and wearable devices (e.g., smartglasses, digital eyewear, headwear, headgear, and head-mounted displays), include internal sensors for collecting information about the location, orientation, motion, and heading of the device.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 3 is a diagrammatic depiction of a three-dimensional scene, a left raw image captured by a left visible-light camera, and a right raw image captured by a right visible-light camera;

DETAILED DESCRIPTION

Figure 1A:
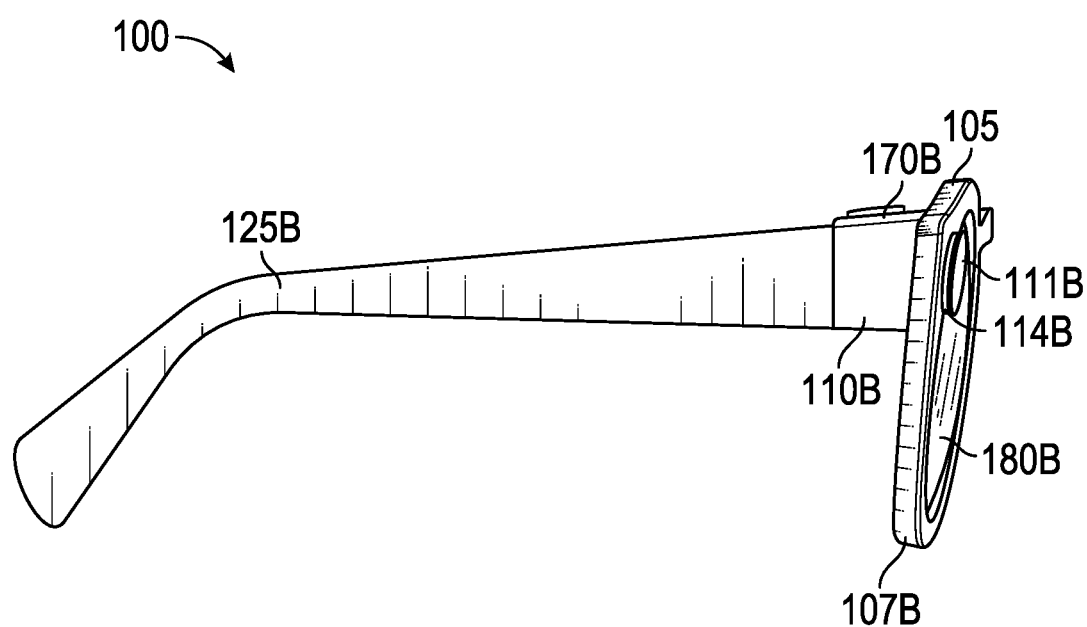
FIG. 1A is a side view (right) of an example hardware configuration of an eyewear device that may be utilized in a message composition and sharing system.

Various implementations and details are described with reference to an example: a message composition and sharing system for presenting a keyboard on a display (e.g., projected onto at least one lens of a portable eyewear device), collecting course data associated with a course traveled by a hand in motion holding a handheld device (e.g., a ring), overlaying a trace onto the displayed keyboard, such that the trace is correlated in near real-time with the course being traveled by the hand (e.g., for selecting alphanumeric characters in a swiping motion from letter to letter), identifying and selecting candidate words from a set, presenting as text the highest-ranked word for each course, composing a message, and sending the message. In addition to the message composition and sharing system, the systems and methods described herein may be applied to and used with any of a variety of systems, especially those in which a user desires to compose and send a message using a handheld device and a displayed keyboard without necessarily using a mobile telephone.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 utilized in a message composition and sharing system, as described herein, which shows a right visible-light camera 114B for gathering image information. As further described below, two cameras 114A, 114B capture image information for a scene from two separate viewpoints. The two captured images may be used to project a three-dimensional display onto a screen for viewing with 3D glasses.

Figure 1B:
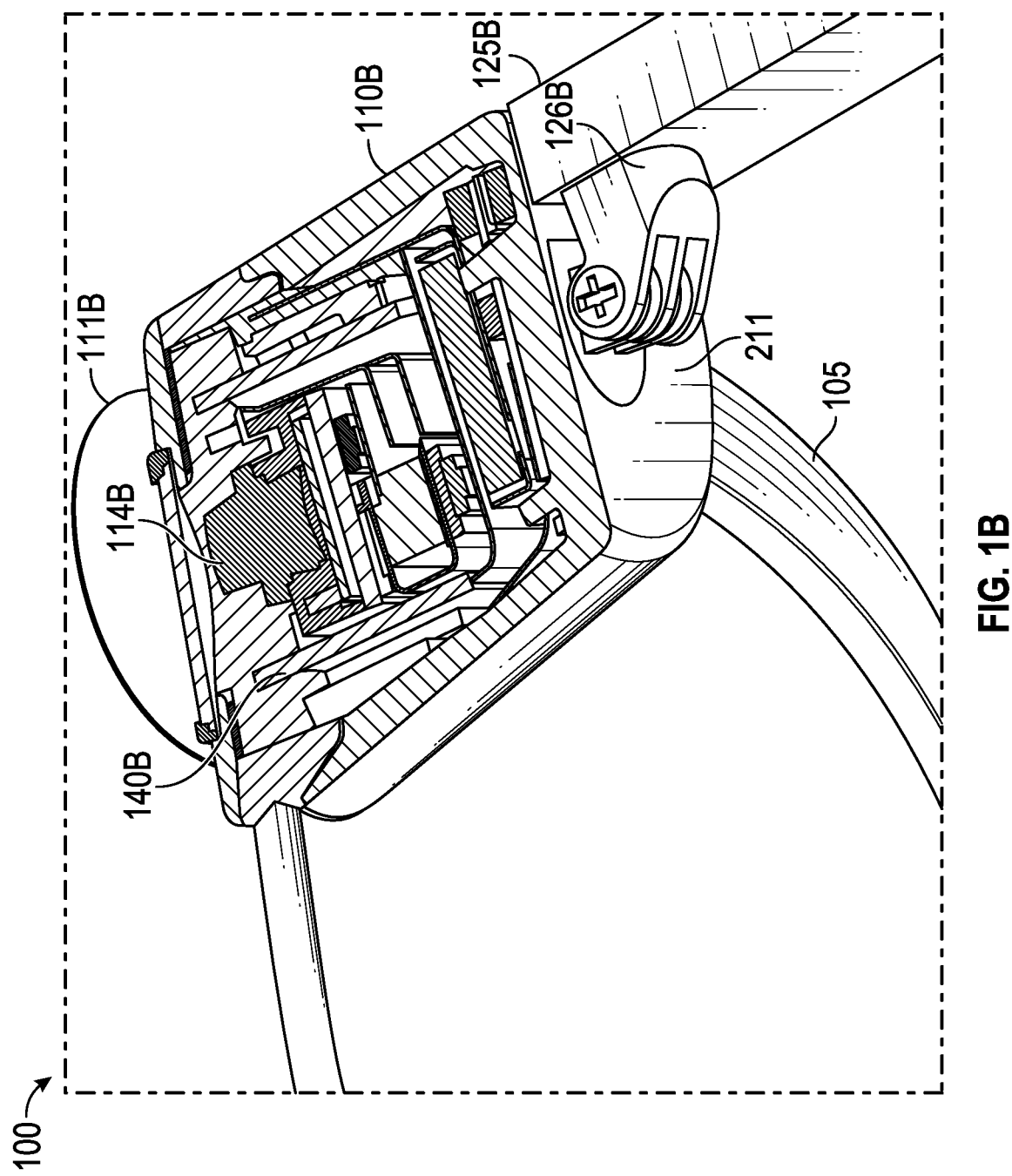
FIG. 1B is a top, partly sectional view of a right chunk of the eyewear device of FIG. 1A depicting a right visible-light camera, and a circuit board.
Figure 1C:
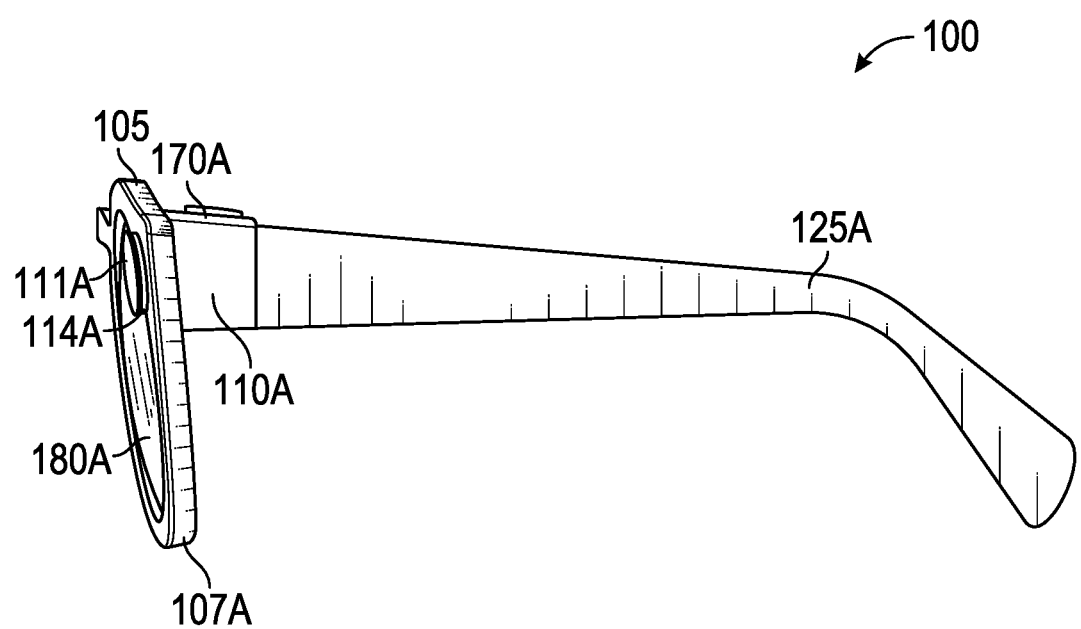
FIG. 1C is a side view (left) of an example hardware configuration of the eyewear device of FIG. 1A, which shows a left visible-light camera.
Figure 1D:
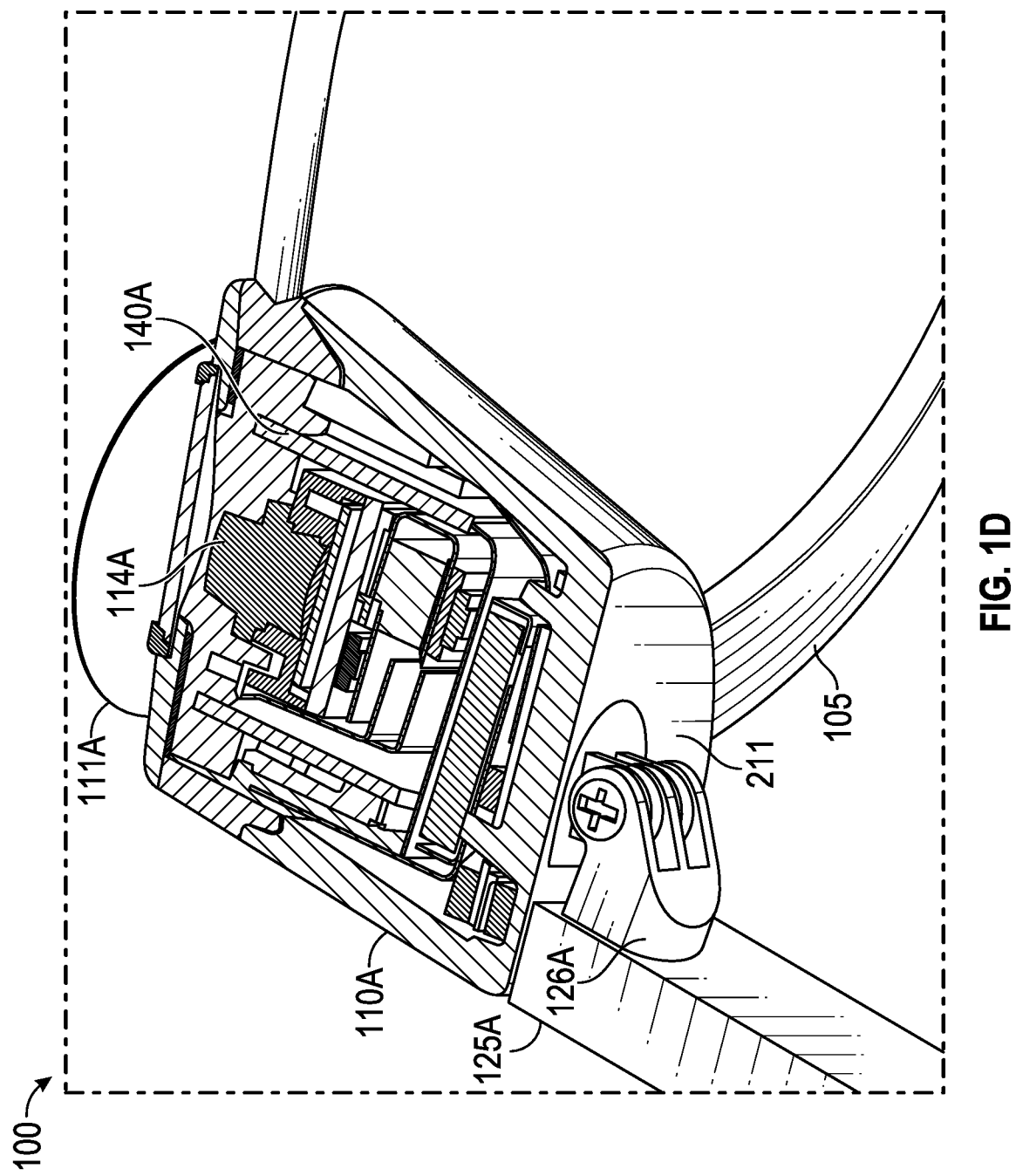
FIG. 1D is a top, partly sectional view of a left chunk of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right chunk 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 813. Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 220 (see FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The left and right raw images captured by respective visible-light cameras 114A, 114B are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, a blue pixel light value, or combination thereof); and a position attribute (e.g., an X-axis coordinate and a Y-axis coordinate).

In order to capture stereo images for later display as a three-dimensional projection, the image processor 912 (shown in FIG. 4) may be coupled to the visible-light cameras 114A, 114B to receive and store the visual image information. A timestamp for each image may be added by the image processor 912 or another processor which controls operation of the visible-light cameras 114A, 114B, which act as a stereo camera to simulate human binocular vision. The timestamp on each pair of images allows the images to be displayed together as part of a three-dimensional projection. Three-dimensional projections create an immersive, life-like experience that is desirable in a variety of contexts, including virtual reality (VR) and video gaming.

FIG. 3 is a diagrammatic depiction of a three-dimensional scene 715, a left raw image 858A captured by a left visible-light camera 114A, and a right raw image 858B captured by a right visible-light camera 114B. The left field of view 111A may overlap, as shown, with the right field of view 111B. The overlapping field of view 813 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 858A, 858B may be processed to include a timestamp, which allows the images to be displayed together as part of a three-dimensional projection.

For the capture of stereo images, as illustrated in FIG. 3, a pair of raw red, green, and blue (RGB) images are captured of a real scene 715 at a given moment in time—a left raw image 858A captured by the left camera 114A and right raw image 858B captured by the right camera 114B. When the pair of raw images 858A, 858B are processed (e.g., by the image processor 912), depth images are generated. The generated depth images may be viewed on an optical assembly 180A, 180B of an eyewear device, on another display (e.g., the image display 880 on a mobile device 890), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, a blue pixel light value, or a combination thereof); a position attribute (e.g., an X location coordinate, a Y location coordinate, and a Z location coordinate); a texture attribute, a reflectance attribute, or a combination thereof. The texture attribute quantifies the perceived texture of the depth image, such as the spatial arrangement of color or intensities in a region of vertices of the depth image.

In one example, the message composition and sharing system 1000 includes the eyewear device 100, which includes a frame 105 and a left temple 110A extending from a left lateral side 170A of the frame 105 and a right temple 110B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 858A from the left side of scene 715. The eyewear device 100 further includes a right visible-light camera 114B with a right field of view 111B. The right camera 114B is connected to the frame 105 or the right temple 110B to capture a right raw image 858B from the right side of scene 715.

FIG. 1B is a top cross-sectional view of a right chunk 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left chunk 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right chunk 110B to a right temple 125B of the eyewear device 100. A left hinge 126A connects the left chunk 110A to a left temple 125A of the eyewear device 100. In some examples, components of the right visible-light camera 114B, the flexible PCB 140B, or other electrical connectors or contacts may be located on the right temple 125B or the right hinge 126B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
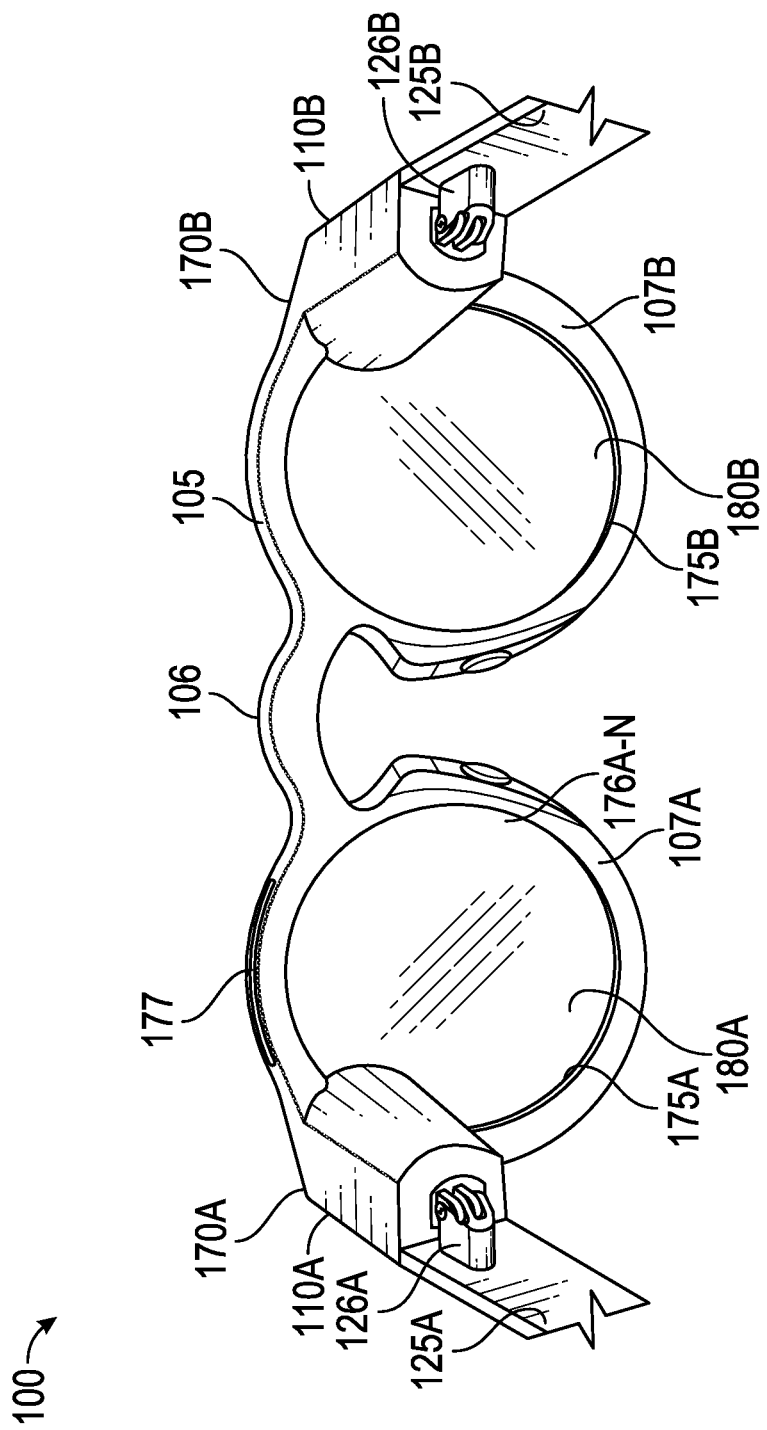
FIGS. 2A and 2B are rear views of example hardware configurations of an eyewear device utilized in the message composition and sharing system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right chunk 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right chunk 110B in which an opening is formed with an outward-facing angle of coverage, but in a different outwardly direction. The coupling can also be indirect via intervening components.

As shown in FIG. 1B, flexible PCB 140B is disposed inside the right chunk 110B and is coupled to one or more other components housed in the right chunk 110B. Although shown as being formed on the circuit boards of the right chunk 110B, the right visible-light camera 114B can be formed on the circuit boards of the left chunk 110A, the temples 125A, 125B, or the frame 105.

Figure 2B:
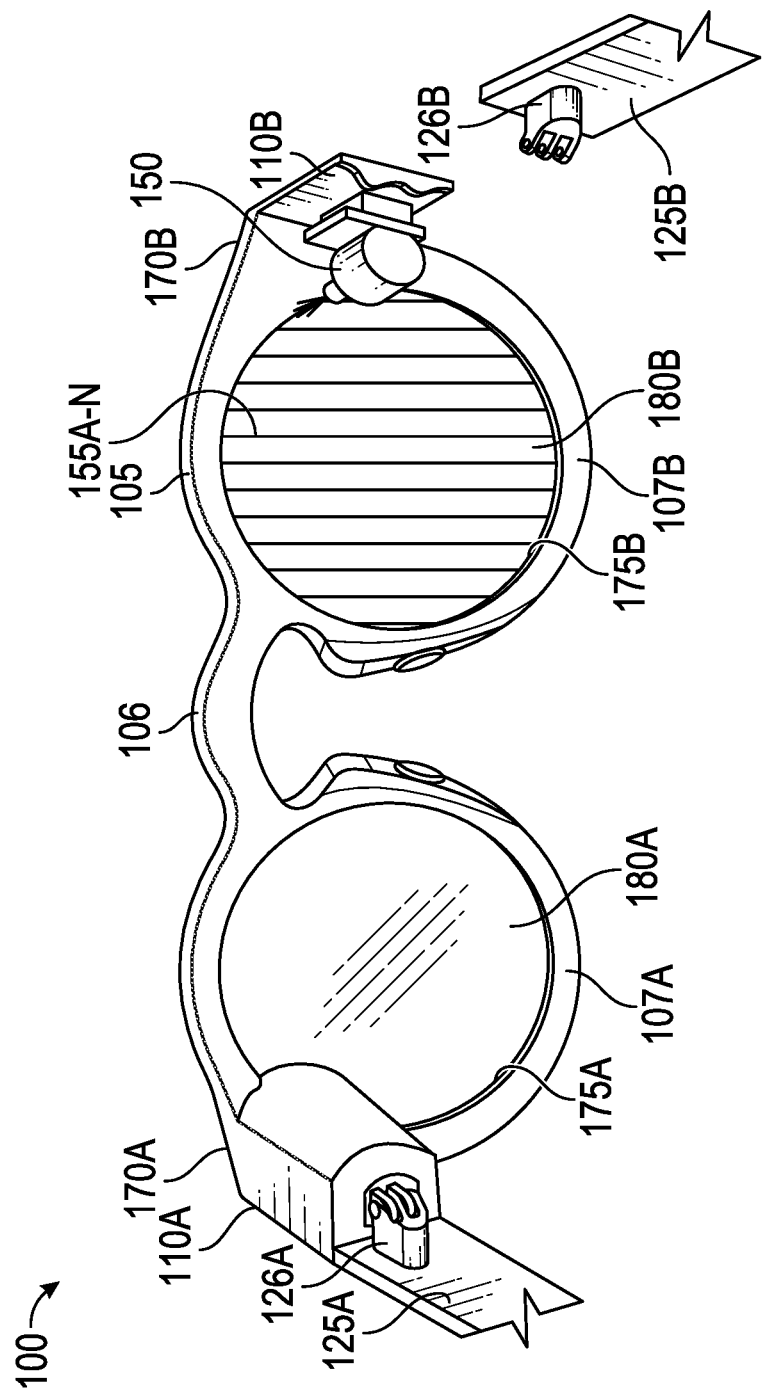

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective sides 170A, 170B (as illustrated) or implemented as separate components attached to the frame 105 on the respective sides 170A, 170B. Alternatively, the chunks 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 912 on the eyewear device 100 may execute programming to apply the voltage to the LCD layer in order to create an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B, across a depth of the lens between the front surface and the rear surface of the lens, or a combination thereof.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective lateral sides 170A, 170B (as illustrated) or implemented as separate components attached to the frame 105 on the respective sides 170A, 170B. Alternatively, the chunks 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
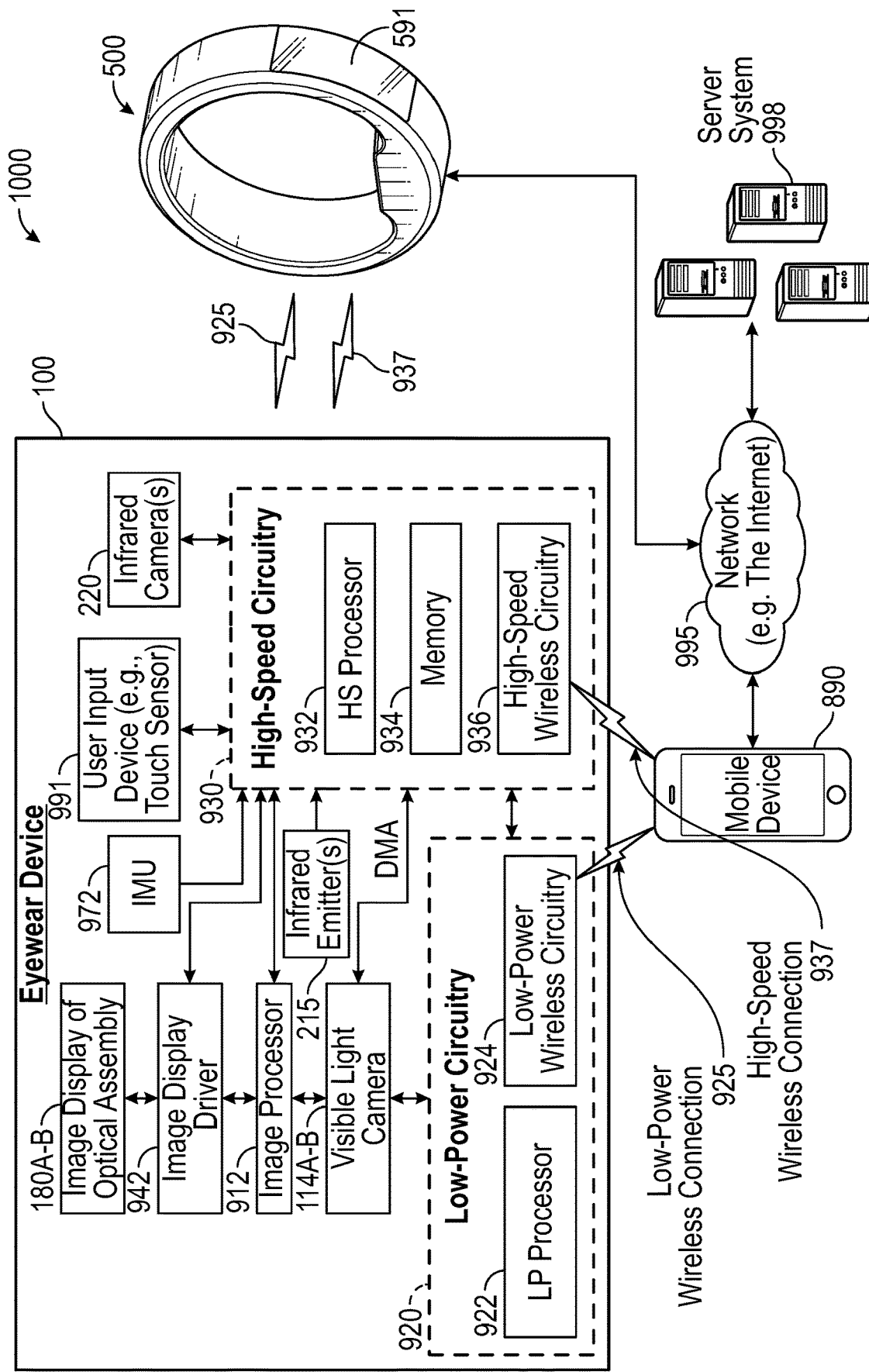
FIG. 4 is a functional block diagram of an example message composition and sharing system including an eyewear device, a mobile device, a handheld device (e.g., a smart ring), and a server system connected via various networks.

FIG. 4 is a functional block diagram of an example message composition and sharing system 1000 including an eyewear device 100, a mobile device 890, a handheld device 500 (e.g., a ring), and a server system 998 connected via various networks 995 such as the Internet. The system 1000 includes a low-power wireless connection 925 and a high-speed wireless connection 937 between the eyewear device 100 and a mobile device 890—and between the eyewear device 100 and the ring 500—as shown.

The eyewear device 100 includes one or more visible-light cameras 114A, 114B which may be capable of capturing still images or video, as described herein. The cameras 114A, 114B may have a direct memory access (DMA) to high-speed circuitry 930. A pair of cameras 114A, 114B may function as a stereo camera, as described herein. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 220.

The eyewear device 100 further includes two image displays of each optical assembly 180A, 180B (one associated with the left side 170A and one associated with the right side 170B). The eyewear device 100 also includes an image display driver 942, an image processor 912, low-power circuitry 920, and high-speed circuitry 930. The image displays of each optical assembly 180A, 180B are for presenting images, including still images and video. The image display driver 942 is coupled to the image displays of each optical assembly 180A, 180B in order to control the images displayed. The eyewear device 100 further includes a user input device 991 (e.g., a touch sensor or touchpad) to receive a two-dimensional input selection from a user.

The components shown in FIG. 4 for the eyewear device 100 are located on one or more circuit boards, for example a PCB or flexible PCB, located in the rims or temples. Alternatively, or additionally, the depicted components can be located in the chunks, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 100 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 100, as can other elements of the network 995.

Memory 934 includes any storage device capable of storing various data and applications, including, among other things, camera data generated by the left and right visible-light cameras 114A, 114B, the infrared camera(s) 220, the image processor 912, and images generated for display by the image display driver 942 on the image display of each optical assembly 180A, 180B. Although the memory 934 is shown as integrated with high-speed circuitry 930, the memory 934 in other examples may be an independent, standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 5:
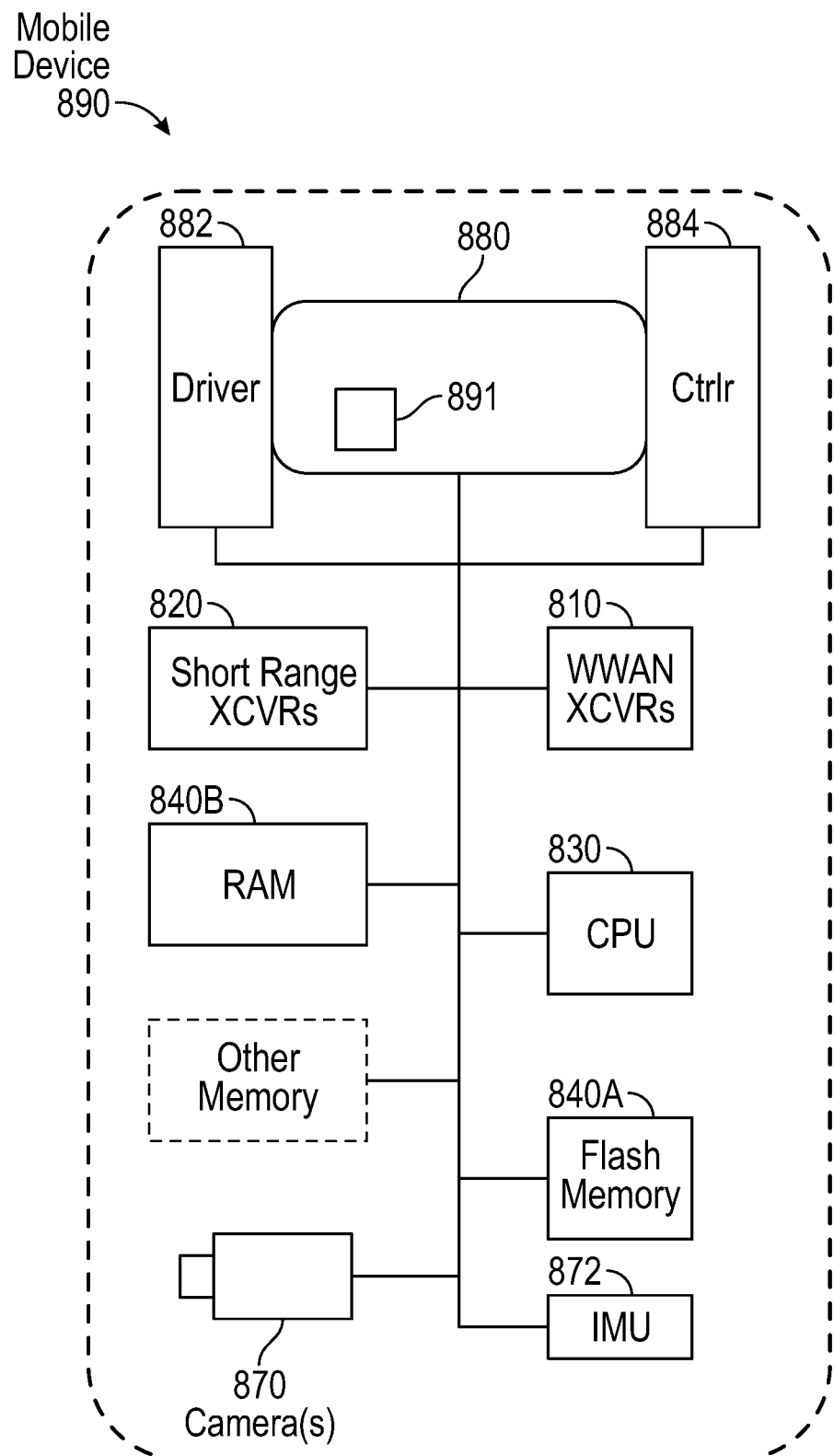
FIG. 5 is a diagrammatic representation of an example hardware configuration for a mobile device of the message composition and sharing system of FIG. 4.

As shown in FIG. 4, the high-speed processor 932 of the eyewear device 100 can be coupled to the camera system (visible-light cameras 114A, 114B), the image display driver 942, the user input device 991, and the memory 934. As shown in FIG. 5, the CPU 830 of the mobile device 890 may be coupled to a camera system 870, a mobile display driver 882, a user input layer 891, and a memory 840A. The eyewear device 100 can perform all or a subset of any of the functions described herein which result from the execution of the message composition and sharing system 1000 in the memory 934 by the processor 932 of the eyewear device 100. The mobile device 890 can perform all or a subset of any of the functions described herein which result from the execution of the message composition and sharing system 1000 in the flash memory 840A by the CPU 830 of the mobile device 890. Functions can be divided in the message composition and sharing system 1000 such that the ring 500 collects raw data from the IMU 572 and sends it to the eyewear device 100 which performs the displaying, comparing, and composing functions.

The server system 998 may be one or more computing devices as part of a service or network computing system, for example, that include a processor, a memory, and network communication interface to communicate over the network 995 with an eyewear device 100 and a mobile device 890.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 942. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force, of both of touches or touch gestures, or other tactile-configured elements), and audio input components (e.g., a microphone), and the like. The mobile device 890 and the server system 998 may include alphanumeric, pointer-based, tactile, audio, and other input components.

In some examples, the eyewear device 100 includes a collection of motion-sensing components referred to as an inertial measurement unit 972. The motion-sensing components may be micro-electro-mechanical systems (MEMS) with microscopic moving parts, often small enough to be part of a microchip. The inertial measurement unit (IMU) 972 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 934 and executed by the high-speed processor 932 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The message composition and sharing system 1000, as shown in FIG. 4, includes a computing device, such as mobile device 890, coupled to an eyewear device 100 and to a handheld device or ring 500 over a network. The eyewear device 100, as described herein, includes an inertial measurement unit 972 for collecting data about the position, orientation, and motion of the eyewear device 100.

Figure 6:
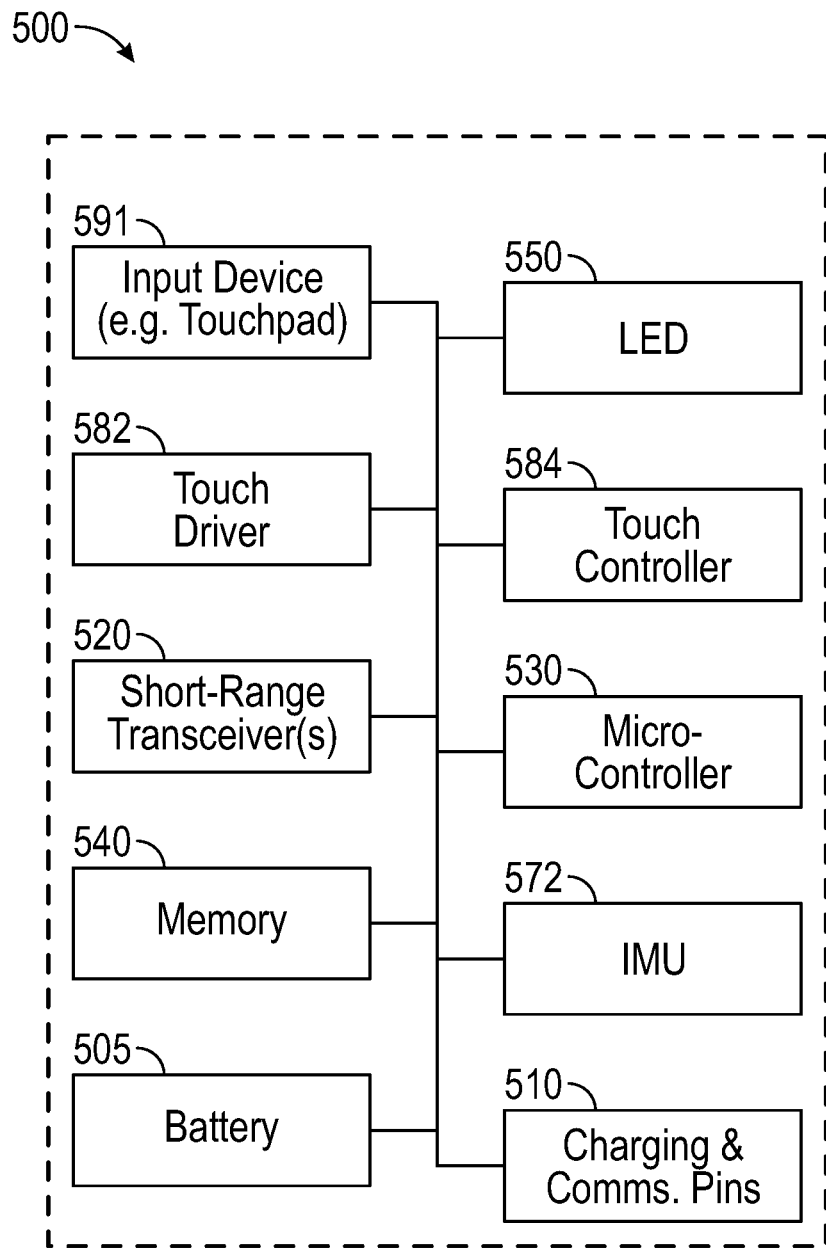
FIG. 6 is a diagrammatic representation of an example hardware configuration for a handheld device (e.g., a smart ring) of the message composition and sharing system of FIG. 4.

The message composition and sharing system 1000 further includes a memory for storing instructions (including those in a message composition system) and a processor for executing the instructions. Execution of the instructions of the message composition system by the processor 932 configures the eyewear device 100 to cooperate with the ring 500 and compose a message. The system 1000 may utilize the memory 934 of the eyewear device 100 or the memory elements 840A, 840B of the mobile device 890 (FIG. 5) or the memory 540 of the ring 500 (FIG. 6). Also, the system 1000 may utilize the processor elements 932, 922 of the eyewear device 100 or the central processing unit (CPU) 830 of the mobile device 890 (FIG. 5) or the microcontroller 530 of the ring 500 (FIG. 6). Furthermore, the system 1000 may further utilize the memory and processor elements of the server system 998. In this aspect, the memory and processing functions of the message composition and sharing system 1000 can be shared or distributed across the eyewear device 100, the mobile device 890, the ring 500, or the server system 998.

The mobile device 890 may be a smartphone, tablet, laptop computer, access point, or any other such device capable of connecting with eyewear device 100 using both a low-power wireless connection 925 and a high-speed wireless connection 937. Mobile device 890 is connected to server system 998 and network 995. The network 995 may include any combination of wired and wireless connections.

FIG. 5 is a high-level functional block diagram of an example mobile device 890. Mobile device 890 includes a flash memory 840A which includes programming to perform all or a subset of the functions described herein. Mobile device 890 may include a camera 870 that comprises at least two visible-light cameras (first and second visible-light cameras with overlapping fields of view) or at least one visible-light camera and a depth sensor with substantially overlapping fields of view and an IMU 872. Flash memory 840A may further include multiple images or video, which are generated via the camera 870.

As shown, the mobile device 890 includes an image display 880, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content As shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

FIG. 6 is a high-level functional block diagram of an example handheld device, such as a ring 500. The ring 500, as shown, includes an input device 591 (e.g., a touchpad), a lamp 550 (e.g., a light-emitting diode), a touch driver 582, a touch controller 584, a short-range transceiver 520, a microcontroller 530, a memory 540, an inertial measurement unit (IMU) 572, a battery 505, and one or more charging and communications pins 510.

The ring 500 includes at least one short-range transceiver 520 that is configured for short-range network communication, such as via NFC, VLC, DECT, ZigBee, Bluetooth™, BLE (Bluetooth Low-Energy), or WiFi. The short-range transceiver(s) 520 may take the form of any available two-way wireless local area network (WLAN) transceiver of a type that is compatible with one or more standard protocols of communication implemented in wireless local area networks, such as one of the Wi-Fi standards under IEEE 802.11.

The ring 500 may also include a global positioning system (GPS) receiver. Alternatively, or additionally, the ring 500 can utilize either or both the short-range transceiver(s) 520 for generating location coordinates for positioning. For example, cellular network, WiFi, or Bluetooth™ based positioning systems can generate very accurate location coordinates, particularly when used in combination. Such location coordinates can be transmitted to one or more eyewear devices 100, or to one or more mobile devices 890, over one or more network connections via the transceiver(s) 520.

The transceivers 520 (i.e., the network communication interface) conforms to one or more of the various digital wireless communication standards utilized by modern mobile networks. Examples of WWAN transceivers include but are not limited to transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 520 provide two-way wireless communication of information including digitized audio signals, still image and video signals, web page information for display as well as web-related inputs, and various types of mobile message communications to or from the ring 500.

The ring 500 further includes a microcontroller 530 that functions as a central processing unit (CPU) for the ring 500, as shown in FIG. 6. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the microprocessor. The microcontroller 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the microcontroller 530 or processor hardware in smartphone, laptop computer, and tablet.

The microcontroller 530 serves as a programmable host controller for the message composition and sharing system 1000 by configuring the ring 500 to perform various operations; for example, in accordance with instructions or programming executable by the microcontroller 530. For example, such operations may include various general operations of the ring 500, as well as operations related to the programming for applications that reside on the ring 500. Although a processor may be configured by use of hardwired logic, typical processors in mobile devices are general processing circuits configured by execution of programming.

The ring 500 includes one or more memory elements 540 for storing programming and data. The memory 540 may include a flash memory, a random-access memory (RAM), or other memory elements, as needed. The memory 540 stores the programming and instructions needed to perform all or a subset of the functions described herein. The RAM, if present, may operate as short-term storage for instructions and data being handled by the microcontroller 530. Depending on the particular type of handheld device, the ring 500 stores and runs an operating system through which specific applications are executed. The operating system may be a mobile operating system, such as Google Android, Apple iOS, Windows Mobile, Amazon Fire OS, RIM BlackBerry OS, or the like.

In some examples, the ring 500 includes a collection of motion-sensing components referred to as an inertial measurement unit 572. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the ring 500 (including the acceleration due to gravity) relative to three orthogonal axes (x, y, z). The gyroscope senses the angular velocity of the ring 500 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the ring 500 relative to magnetic north. The position of the ring 500 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 572 may include or cooperate with a digital motion processor or programming that gathers the raw data from the components and compute a number of useful values about the position, orientation, and motion of the ring 500. For example, the acceleration data gathered from the accelerometer can be integrated to obtain the velocity relative to each axis (x, y, z); and integrated again to obtain the position of the ring 500 (in linear coordinates, x, y, and z). The angular velocity data from the gyroscope can be integrated to obtain the position of the ring 500 (in spherical coordinates). The programming for computing these useful values may be stored in memory 934 and executed by the high-speed processor 932 of the eyewear device 100.

The ring 500 may optionally include additional peripheral sensors, such as biometric sensors, specialty sensors, or display elements integrated with the ring 500. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

Figure 7:
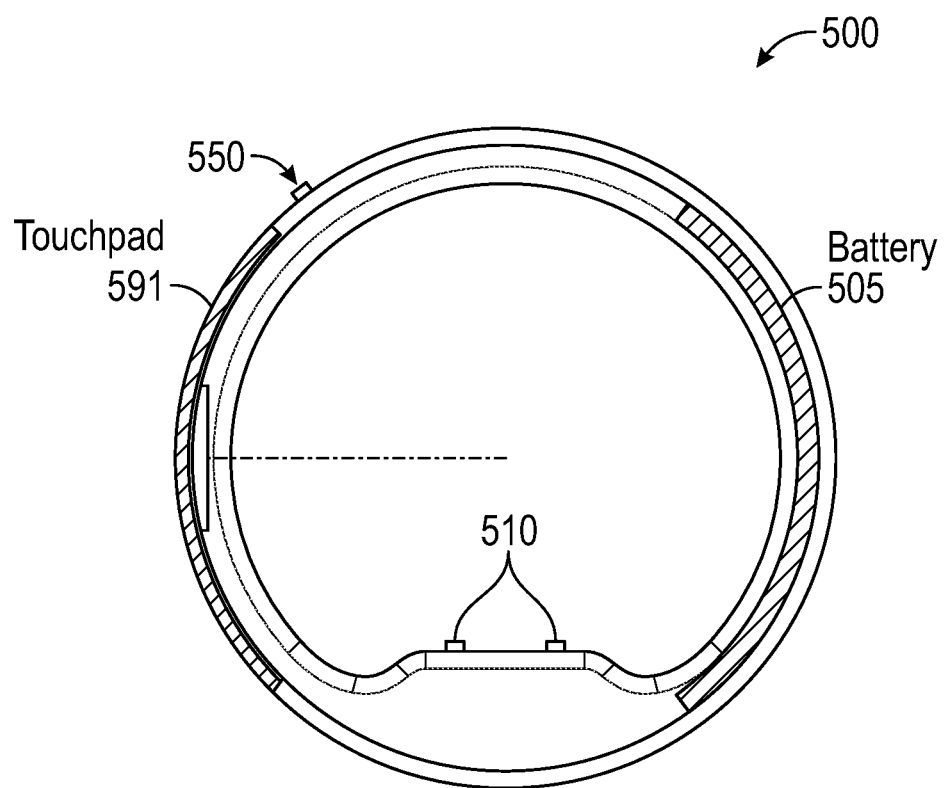
FIG. 7 is a schematic view of an example hardware configuration for a handheld device (e.g., a smart ring) of the message composition and sharing system of FIG. 4.

FIG. 7 is a schematic view of an example hardware configuration for a ring 500. The touchpad 591, a shown, may be sized and shaped to conform closely to an outer surface of the ring 500. The ring 500 may also include an LED 550. The battery 505 may be sized and shaped to fit within the body of the ring 500, with connections to one or more charging and communications pins 510. As shown, the ring 500 may include an internal space (beneath the pins 510 in this example) to house a variety of components, such as a touch driver 582, a touch controller 584, a short-range transceiver 520, a microcontroller 530, a memory 540, and an inertial measurement unit (IMU) 572.

Figure 8:
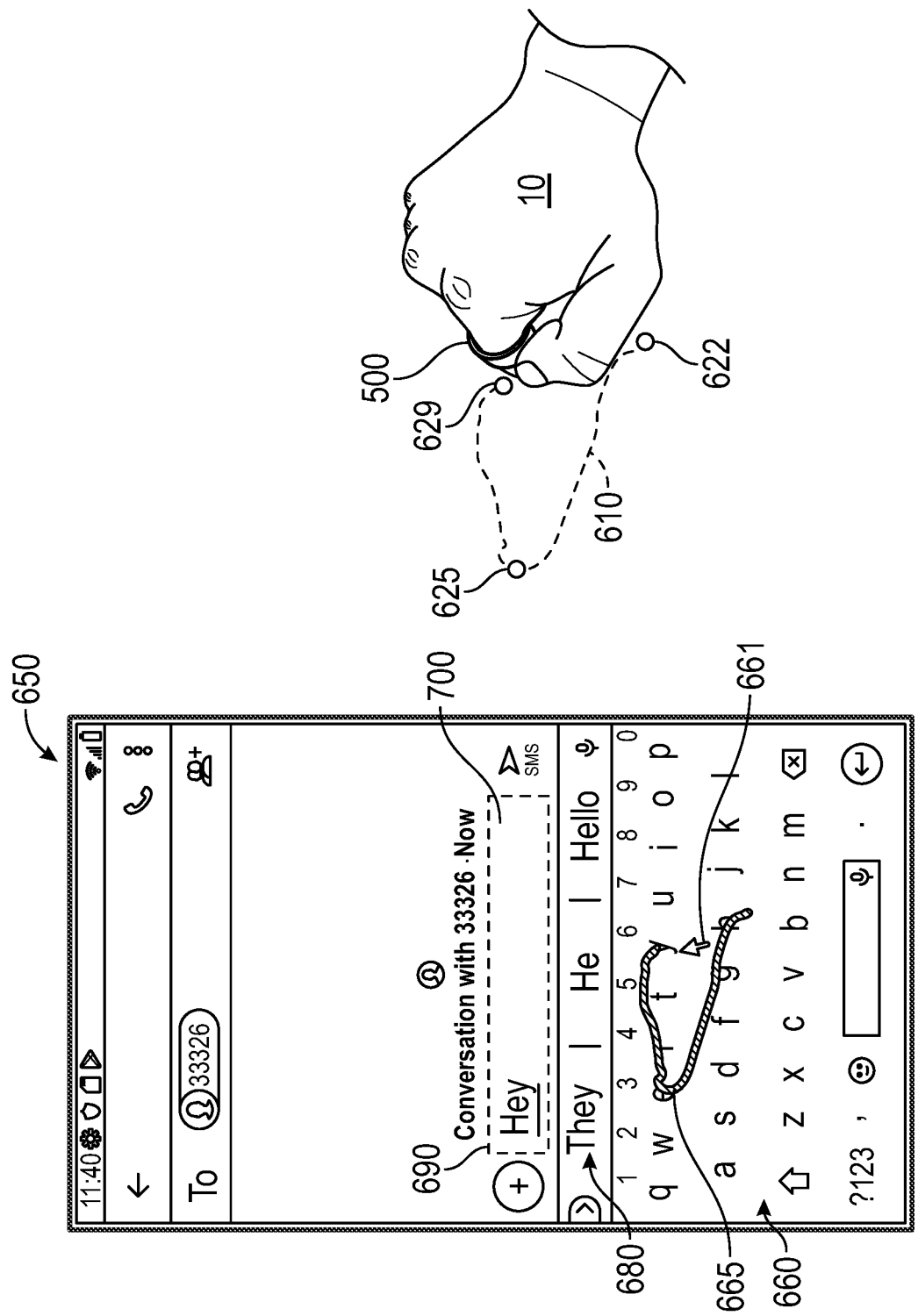
FIG. 8 is an illustration of a handheld device (e.g., a smart ring) moving along a course and a trace on a displayed keyboard, wherein the displayed trace is correlated with the course in near real-time, in the message composition and sharing system of FIG. 4.

FIG. 8 is an illustration of a ring 500 on the index finger of a hand 10. The thumb is touching the touchpad 591. In use, the hand 10 moves the ring 500 along a course 610 from a start location 622, by and past one or more intermediate locations 625, to a stop location 629. When the ring 500 is in motion along the course 610, the IMU 572 is collecting course data. The course data includes information about the location, orientation, motion, heading, or a combination thereof of the ring 500 at each of a plurality of locations along the course 610.

The display 650 illustrated in FIG. 8, in some implementations, includes a keyboard 660, a cursor 661, a candidate words area 680, and a message composition area 690 where a message 700 in progress may be shown. The display 650 also includes a trace 665 that is presented in an overlay relative to the keyboard 660. As shown, the trace 665 has nearly the same path and shape as the course 610 traveled by the ring 500. When the ring 500 is in motion along the course 610, the course data collected by the IMU 572 is used to display the trace 665, so that the trace 665 is correlated with the course 610 in near real-time. In this aspect, the motion of the ring 500 by the hand along a course 610 is nearly immediately translated into a correlated motion of the trace 665 from key to key on the keyboard 660.

The display 650 in some implementations, is projected onto a surface, such as a head-mounted screen or an optical element 180A, 180B of an eyewear device 100 as described herein. The eyewear device 100 may include a projector 150 (FIG. 2B) that is positioned and configured to project the keyboard 660, the cursor 661, and the trace 661 onto at least one optical element (e.g., right lens 180B). In this implementation, the ring 500 cooperates with the eyewear device 100 to compose a message.

The message composition and sharing system 1000, as shown in FIG. 4, in some implementations, includes a handheld device (ring 500) and a portable device (eyewear 100). The ring 500 includes a microcontroller 530, an input device (touchpad 591), and an inertial measurement unit 572. The eyewear 100, which is in communication with the ring 500, includes a processor 932, a memory 934, and a display (e.g., the image display associated with at least one lens or optical assembly 180A, 180B).

In an example method of using the message composition and sharing system 1000, a user may begin by sending a start input to the ring 500; for example, by tapping the touchpad 591 with a thumb or finger. The start input may include any of a variety of tap patterns, which may be set or established through a user interface associated with the ring 500.

In response to detecting a start input, the system 1000 may present a keyboard 660 and a cursor 661 on a display 650. The cursor 661 may appear at a default location relative to the keyboard 660. At this time, the cursor 661 may move in correlation with any motion of the ring 500 by the hand 10. In this aspect, the IMU 572 may be collecting position data before the start of a course 610 for a particular word.

The IMU 572 inside the ring 500, in accordance with programming instructions stored in the memory 540, performs the step of collecting course data associated with a course 610 traveled by the hand 10 in motion. The course data is associated with a first word, as well as subsequent words, in a message.

The eyewear device 100 in some implementations, receives the course data from the ring 500 in near real time and in accordance with programming instructions stored in the memory 934, performs the step of overlaying a trace 665 onto the display 650 in a semi-transparent layer superimposed on top of the keyboard 660. The path of the trace 665 is based on the course data being received in near real time from the ring 500.

As the course 610 proceeds, and as the trace 665 passes near one or more letter keys on the keyboard 660, the eyewear device 100 performs the step of identifying one or more candidate words from a set of words stored in the memory 934. The set of words includes, for each word in the set, a usage frequency and path data relative to the key locations (letters) on a keyboard. For example, as illustrated in FIG. 8, the example trace 665 passes near the letter keys for H, then E, then Y. The candidate words THEY and HE and HELLO are displayed in a candidate words area 680.

During this step in the process, the eyewear device 100 performs the step of comparing the course data for the first word to the path data associated with one or more of the candidate words to generate a ranked list of candidate words. The ranked list may be displayed in rank order (e.g., first THEY, then HE, and third HELLO) in a candidate words area 680.

When the highest-ranked word is identified, the eyewear device 100 performs the step of presenting the highest-ranked word as text on the display; in some implementations, in a message composition area 690. In the example shown in FIG. 8, the highest-ranked word is HEY, which represents the first output word generated by the system 1000 in a message 700 in progress.

Starting and stopping a course 610 associated with a word, in some implementations, includes one or more particular inputs by the thumb or finger that is touching the touchpad 591.

To move into position for starting a new word, the user (while viewing the cursor 661 on the display 650) moves her hand 10 until the cursor 661 relative to the displayed keyboard 660 is near a first key location associated with the first letter of the new word. This motion places the ring 500 near the start location 622 for the course 610 to be traveled by the hand 10 for the new word.

To start a course 610 for a new word, the user in some implementations will press and hold thumb or finger on the touchpad 591 and, thus, engage the IMU 572 to begin and continue the process of collecting the course data for a word while moving the hand 10 along the course 610. The course data includes information from the IMU 572 about the location, orientation, motion, heading, or a combination thereof of the ring 500 at each of a plurality of locations along the course 610.

To stop a course 610 for a new word, the user in some implementations will release the thumb or finger from the touchpad 591 and, thus, stop the IMU 572 from collecting further course data for the word. The act of releasing occurs when the trace 661 relative to the displayed keyboard 660 is near a last key location associated with a last letter of the word.

As described herein, the trace 665 moves in near real-time and follows the path of the course 610 traveled by the hand 10 in motion. The trace 665 in some implementations has a leading end and a trailing end. The cursor 661 may be persistently displayed near the leading end of the trace 665. For lengthy words, the trace 665 may obscure all or part of the keyboard 660. The trace 665 may have an active length that is shorter than the distance between the first letter key and the last letter key in a word. To clear part of the trace 665, the system may fade or slowly dissipate a portion the trailing end of the trace 665, leaving only the active length visible on the display.

The message composition and sharing system 1000 may be used, of course, to compose a message 700 that includes a number of words and characters. When the process is completed for a first word, the system 1000 is configured to repeat the process for a subsequent word. In some implementations, the eyewear device 100 in accordance with programming instructions stored in the memory 934 performs the steps of fading the first trace from the display; displaying a subsequent trace based on subsequent course data for a subsequent word; comparing the subsequent course data to the path data associated with the candidate words to generate a subsequent ranked list; presenting as text a subsequent highest-ranked word according to the subsequent ranked list, where the subsequent highest-ranked word represents a subsequent output word in the message. The system 1000 may receive a recipient identifier and then send the message to the recipient.

The IMU 572 inside the ring 500 is collecting course data when the ring 500 is in motion along the course 610. The course data includes information about the location, orientation, motion, heading, or a combination thereof of the ring 500 at each of a plurality of locations along the course 610. In some implementations, the ring 500 in accordance with programming instructions stored in the memory 540 performs the step of placing (mathematically) an origin of three orthogonal axes near the start location 622 of the course 610 for a first word. In this aspect, the ring 500 establishes an origin (with zero coordinates: 0, 0, 0) at the start location 622. The accelerometer element of the IMU 572 collects a first linear acceleration of the ring 500 and the gyroscope element of the IMU 572 senses the angular velocity of the ring 500 at each of the plurality of locations along the course 610. The ring 500 (or the eyewear device 100) in accordance with programming instructions, then performs the step of computing a first position (in three coordinates: x, y, z), based on the course data, for each of the plurality of locations along the course 610.

In some implementations, the ring 500 performs the step of computing the first position of the ring 500 for each of the plurality of locations along the course 610 based on both the accelerometer data and the gyroscope data from the IMU 572. Together, the accelerometer and gyroscope can provide position, orientation, and motion data about the device relative to six axes or degrees of freedom (x, y, z, pitch, roll, yaw). The ring 500 computes the course 610 based on the combination, blending, or fusion of the accelerometer data and the gyroscope data. In this aspect, both the accelerometer data and the gyroscope data are useful in computing the course 610 of the ring 500 which, in turn, influences the display of the trace 661 on the display 650.

The systems and methods described herein may be used for composing a message 700 for sending to others, such as a text message, and also for any other text-related task. For example, the course 610, the display 650, and the trace 665 may be used to enter a username or password, to name a file when saving, to add a hashtag to a photo or other file, to select from a list, and to enter search terms, and the like.

Any of the message composition and sharing functionality described herein for the eyewear device 100, the ring 500, the mobile device 890, and the server system 998 can be embodied in one more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of composing a message, comprising:
presenting a keyboard on a display coupled to and supported by a portable device further comprising a processor and a memory, wherein the portable device is in communication with a handheld device comprising an inertial measurement unit and supported by a hand;
collecting course data from the inertial measurement unit, wherein the course data comprises a sequence of locations along a course traveled by the hand from a start location to a stop location;
presenting a trace based on the course data as an overlay on the display relative to the keyboard;
identifying one or more candidate words from a set of words stored in the memory, the set of words comprising for each word a usage frequency and a path data comprising a series of key locations relative to the keyboard;

comparing the course data to the path data associated with the one or more candidate words to generate a ranked list; and presenting at least one of the one or more candidate words in a candidate word area on the display.

2. The method of claim 1, further comprising:
presenting on the display a highest-ranked word according to the ranked list and the usage frequency;
composing a message comprising the highest-ranked word; and
sending the message to a recipient.

3. The method of claim 1, further comprising:
detecting a start input from an input device coupled to and supported by the handheld device; and
presenting the keyboard in response to the start input.

4. The method of claim 3, wherein the portable device comprises an electronic eyewear device, wherein the handheld device comprises a ring defining a hole sized and shaped to slidably receive therethrough a finger of the hand, wherein the input device comprises a touchpad positioned on an outer surface of the ring, and wherein detecting the start input further comprises:
detecting a tap pattern relative to the touchpad, wherein the tap pattern comprises an action by a thumb or a second finger of the hand selected from the group consisting of: a single tap, a double tap, and a press and hold detected during a predefined and configurable duration.

5. The method of claim 1, wherein the trace comprises a leading end extending along an active length to a trailing end, and wherein presenting the trace further comprises:
presenting a cursor on the display near the leading end of the trace as an overlay on the display relative to the keyboard; and
dissipating the trailing end of the trace such that the active length appears on the display.

6. The method of claim 5, wherein presenting the cursor further comprises:
positioning the cursor relative to the keyboard on the display based on the start location associated with the course, such that the cursor is near a first key location associated with a first letter of a first word.

7. The method of claim 6, wherein collecting the course data further comprises:
discontinuing the collecting of the course data associated with the first word in response to a releasing action, such that the trace relative to the displayed keyboard is near a last key location associated with a last letter of the first word.

8. The method of claim 7, wherein the handheld device is coupled to and supports an input device, and wherein collecting the course data further comprises:
beginning the collecting of the course data associated with the first word in response to detecting a press and hold by a finger of the hand relative to the input device;
continuing the collecting of the course data while the hand is moving along the course until the releasing action is detected, wherein the releasing action comprises detecting a release of the finger relative to the input device.

9. A message composition system, comprising:
a handheld device comprising an inertial measurement unit;
a portable device in communication with the handheld device and comprising a processor, a memory, and a display;
a message composition system program stored in the memory, wherein execution of the program by the processor configures the message composition system to perform functions, including functions to:
collect course data from the inertial measurement unit, wherein the course data comprises a sequence of locations along a course traveled by a hand supporting the handheld device from a start location to a stop location;
present on the display a keyboard, a cursor, and a trace based on the course data;
identify one or more candidate words from a set of words stored in the memory, the set of words comprising for each word a usage frequency and a path data comprising a series of key locations relative to the keyboard;
compare the course data to the path data associated with the one or more candidate words to generate a ranked list; and
present at least one of the one or more candidate words in a candidate word area on the display.

10. The message composition system of claim 9, wherein the functions further comprise functions to:
present on the display a highest-ranked word according to the ranked list and the usage frequency;
compose a message comprising the highest-ranked word; and
send the message to a recipient.

11. The message composition system of claim 9, wherein the functions further comprise functions to:
detect a start input from an input device coupled to and supported by the handheld device; and
present the keyboard in response to the start input.

12. The message composition system of claim 11, wherein the portable device comprises an electronic eyewear device, wherein the handheld device comprises a ring defining a hole sized and shaped to slidably receive therethrough a finger of the hand, wherein the input device comprises a touchpad positioned on an outer surface of the ring, and wherein the functions further comprise functions to:
detect a tap pattern relative to the touchpad, wherein the tap pattern comprises an action by a thumb or a second finger of the hand selected from the group consisting of: a single tap, a double tap, and a press and hold detected during a predefined and configurable duration.

13. The message composition system of claim 9, wherein the trace comprises a leading end extending along an active length to a trailing end, and wherein the functions further comprise functions to:
present the cursor on the display near the leading end of the trace as an overlay on the display relative to the keyboard; and
dissipate the trailing end of the trace such that the active length appears on the display.

14. The message composition system of claim 9, wherein the functions further comprise functions to:
position the cursor relative to the keyboard on the display based on the start location associated with the course, such that the cursor is near a first key location associated with a first letter of a first word.

15. The message composition system of claim 14, wherein the functions further comprise functions to:
discontinue the function of collecting of the course data associated with the first word in response to a releasing action, such that the trace relative to the displayed keyboard is near a last key location associated with a last letter of the first word.

16. The message composition system of claim 15, wherein the handheld device is coupled to and supports an input device, and wherein the functions further comprise functions to:
   begin the collecting of the course data associated with the first word in response to detecting a press and hold by a finger of the hand relative to the input device;
   continue the collecting of the course data while the hand is moving along the course until the releasing action is detected, wherein the releasing action comprises detecting a release of the finger relative to the input device.

17. A non-transitory computer-readable medium storing program code which, when executed, is operative to cause a processor of a portable device to perform the steps of:
   presenting a keyboard on a display coupled to and supported by the portable device, wherein the portable device is in communication with a handheld device comprising an inertial measurement unit and supported by a hand;
   collecting course data from the inertial measurement unit, wherein the course data comprises a sequence of locations along a course traveled by the hand from a start location to a stop location;
   presenting a trace based on the course data as an overlay on the display relative to the keyboard;
   identifying one or more candidate words from a set of words comprising for each word a usage frequency and a path data comprising a series of key locations relative to the keyboard;
   comparing the course data to the path data associated with the one or more candidate words to generate a ranked list; and
   presenting at least one of the one or more candidate words in a candidate word area on the display;
   composing a message comprising at least one of the one or more candidate words; and
   sending the message to a recipient.

18. The non-transitory computer-readable medium storing program code of claim 17, wherein the program code when executed is operative to cause the processor to perform the further steps of:
   detecting a start input from an input device coupled to and supported by the handheld device;
   presenting the keyboard in response to the start input;
   presenting a cursor on the display near a leading end of the trace as an overlay relative to the keyboard, wherein the trace extends along an active length form the leading end to a trailing end; and
   dissipating the trailing end of the trace such that the active length appears on the display.

19. The non-transitory computer-readable medium storing program code of claim 18, wherein the portable device comprises an electronic eyewear device, wherein the handheld device comprises a ring defining a hole sized and shaped to slidably receive therethrough a finger of the hand, wherein the input device comprises a touchpad positioned on an outer surface of the ring, and wherein the program code when executed is operative to cause the processor to perform the further step of:
   positioning the cursor relative to the keyboard on the display based on the start location associated with the course, such that the cursor is near a first key location associated with a first letter of a first word.

20. The non-transitory computer-readable medium storing program code of claim 19, wherein the program code when executed is operative to cause the processor to perform the further steps of:
   continuing the collecting of the course data while the hand is moving along the course until a releasing action is detected, wherein the releasing action comprises detecting a release of a thumb or a second finger relative to the input device; and
   discontinuing the collecting of the course data associated with the first word in response to the releasing action, such that the trace relative to the displayed keyboard is near a last key location associated with a last letter of the first word.

* * * * *